(12) United States Patent
Yang et al.

(10) Patent No.: US 10,812,849 B2
(45) Date of Patent: Oct. 20, 2020

(54) METHOD, APPARATUS, AND STORAGE MEDIUM FOR MEDIA FILE DELIVERY

(71) Applicant: TENCENT TECHNOLOGY (SHENZHEN) COMPANY LIMITED, Shenzhen (CN)

(72) Inventors: Xiwang Yang, Shenzhen (CN); Xu He, Shenzhen (CN); Gong Chen, Shenzhen (CN); Chong Peng, Shenzhen (CN); Shi Huang, Shenzhen (CN); Bifeng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 108 days.

(21) Appl. No.: 16/161,497

(22) Filed: Oct. 16, 2018

(65) Prior Publication Data

US 2019/0052922 A1 Feb. 14, 2019

Related U.S. Application Data

(63) Continuation of application No. PCT/CN2017/084896, filed on May 18, 2017.

(30) Foreign Application Priority Data

Jun. 2, 2016 (CN) .......................... 2016 1 0388710

(51) Int. Cl.
*H04N 21/262* (2011.01)
*G06Q 30/02* (2012.01)
(Continued)

(52) U.S. Cl.
CPC ....... *H04N 21/26241* (2013.01); *G06F 17/18* (2013.01); *G06Q 30/0275* (2013.01);
(Continued)

(58) Field of Classification Search
CPC ....... H04N 21/26241; H04N 21/44204; H04N 21/812; G06Q 30/0277; G06Q 30/0275;
(Continued)

(56) References Cited

U.S. PATENT DOCUMENTS

2010/0161419 A1 6/2010 Tomlin
2014/0337120 A1* 11/2014 Ercanbrack ........ G06Q 30/0244
705/14.43
(Continued)

FOREIGN PATENT DOCUMENTS

| CN | 104869442 A | 8/2015 |
|---|---|---|
| CN | 104933591 A | 9/2015 |

(Continued)

OTHER PUBLICATIONS

The World Intellectual Property Organization (WIPO) International Search Report for PCT/CN2017/084896 dated Aug. 16, 2017 5 pages (including translation).
(Continued)

*Primary Examiner* — Cynthia M Fogg
(74) *Attorney, Agent, or Firm* — Anova Law Group, PLLC

(57) ABSTRACT

The present disclosure provides method, apparatus, and storage medium for media file delivery. The method includes: obtaining a target resource consumption and an actual resource consumption of a first media file, one time of delivery of the first media file corresponding to one time of resource consumption; comparing the target resource consumption with the actual resource consumption, to obtain a first comparison result; adjusting, according to the first comparison result, a value of a resource contention parameter of the first media file from a first value to a second value, the resource contention parameter being used for determining a delivery order of the first media file when the first
(Continued)

media file participates in a delivery contention; and performing a first delivery operation on the first media file according to the resource contention parameter whose value is the second value.

16 Claims, 10 Drawing Sheets

(51) Int. Cl.
G06F 17/18 (2006.01)
H04N 21/442 (2011.01)
H04N 21/81 (2011.01)

(52) U.S. Cl.
CPC ... G06Q 30/0277 (2013.01); H04N 21/44204 (2013.01); H04N 21/812 (2013.01)

(58) Field of Classification Search
CPC ........... G06Q 30/0242; G06Q 30/0249; G06Q 30/0251; G06Q 30/0244; G06Q 30/0241; G06Q 30/0246; G06Q 30/0272; G06Q 30/0276; G06F 17/18; G06F 16/9535; G06F 16/40

USPC .......................................................... 725/32
See application file for complete search history.

(56) References Cited

U.S. PATENT DOCUMENTS

| 2015/0332349 | A1* | 11/2015 | Els | G06Q 30/0275 |
| | | | | 705/14.71 |
| 2016/0117719 | A1* | 4/2016 | Hood | H04N 21/2547 |
| | | | | 705/14.42 |
| 2017/0034594 | A1* | 2/2017 | Francis | H04N 21/26241 |

FOREIGN PATENT DOCUMENTS

| CN | 106055666 A | 10/2016 |
| CN | 106056409 A | 10/2016 |
| CN | 106096999 A | 11/2016 |
| EP | 2154645 A1 | 2/2010 |

OTHER PUBLICATIONS

The European Patent Office (EPO) The Extended European Search Report for 17805666.9 dated May 14, 2019 9 Pages.

* cited by examiner

METHOD, APPARATUS, AND STORAGE MEDIUM FOR MEDIA FILE DELIVERY

RELATED APPLICATIONS

This application is a continuation application of PCT Patent Application No. PCT/CN2017/084896, filed on May 18, 2017, which claims priority to Chinese Patent Application No. 201610388710.5, entitled "MEDIA FILE DELIVERY METHOD AND APPARATUS" filed with the Chinese Patent Office on Jun. 2, 2016, all of which is incorporated by reference in their entirety.

FIELD OF THE TECHNOLOGY

The present disclosure relates to the field of computers, and in particular, to method, apparatus, and storage medium for a media file delivery.

BACKGROUND OF THE DISCLOSURE

With the rapid development of multimedia technologies, media files are delivered to delivery objects, at a constant speed according to traffic volume with diversity of the delivered crowd of the media files. For example, advertisements are delivered to users to increase exposure of the advertisements. Advertisements delivered to users can usually be divided into two types: agreement-based advertisements and bidding advertisements.

The agreement-based advertisements are delivered according to a delivery volume in a predetermined agreement, and delivery orders of the agreement-based advertisements may be determined by scores of the advertisements. The scores of the advertisements may be used for indicating correlations between the advertisements and users. When there is a delivery requirement for users, an advertisement whose score is higher is preferentially delivered.

The bidding advertisements are delivered according to bid prices of the advertisements, and an advertisement whose bid price is higher is preferentially delivered. During advertisement delivery, a higher bid price of a bidding advertisement indicates a faster delivery speed. When a bid price of a bidding advertisement is very high, exposure of the bidding advertisement concentrates in a specific time segment, while the bidding advertisement is not exposed or has a relatively few exposure times in other time segments. Diversity of delivered crowd of the bidding advertisements and return on investment ratios of media file delivery parties are greatly affected when delivery speeds of the bidding advertisements are overly fast or slow. This is because it is easier to find delivered crowd having a higher correlation with a media file by means of a constant-speed delivery based on price adjustment.

SUMMARY

Embodiments of the present disclosure provide method, apparatus, and storage medium for a media file delivery, so as to at least resolve technical problems in a related technology that a delivery speed of a bidding advertisement is too fast.

According to one aspect of the embodiments of the present disclosure, a media file delivery method is provided, including: obtaining, by a computing device including at least one processor, a target resource consumption and an actual resource consumption of a first media file, one time of delivery of the first media file corresponding to one time of resource consumption; comparing, by the computing device, the target resource consumption with the actual resource consumption, to obtain a first comparison result; adjusting, by the computing device according to the first comparison result, a value of a resource contention parameter of the first media file from a first value to a second value, the resource contention parameter being used for determining a delivery order of the first media file when the first media file participates in a delivery contention; and performing a first delivery operation on the first media file according to the resource contention parameter whose value is the second value.

According to another aspect of the embodiments of the present disclosure, a media file delivery apparatus is further provided. The apparatus includes a memory, configured to store program instructions; and a processor, coupled to the memory and when the program instructions being executed, configured to: obtain a target resource consumption and an actual resource consumption of a first media file, one time of delivery of the first media file corresponding to one time of resource consumption; compare the target resource consumption with the actual resource consumption, to obtain a first comparison result; adjust, according to the first comparison result, a value of a resource contention parameter of the first media file from a first value to a second value, the resource contention parameter being used for determining a delivery order of the first media file when the first media file participates in a delivery contention; and perform a first delivery operation on the first media file according to the resource contention parameter whose value is the second value.

According to another aspect of the embodiments of the present disclosure, a non-transitory computer-readable storage medium is further provided. The storage medium contains computer-executable program instructions for, when executed by a processor, performing a media file delivery method, the method comprising: obtaining a target resource consumption and an actual resource consumption of a first media file, one time of delivery of the first media file corresponding to one time of resource consumption; comparing the target resource consumption with the actual resource consumption, to obtain a first comparison result; adjusting, according to the first comparison result, a value of a resource contention parameter of the first media file from a first value to a second value, the resource contention parameter being used for determining a delivery order of the first media file when the first media file participates in a delivery contention; and performing a first delivery operation on the first media file according to the resource contention parameter whose value is the second value.

BRIEF DESCRIPTION OF THE DRAWINGS

The accompanying drawings described herein are used for providing a further understanding of the present disclosure, and forming part of the present disclosure. Exemplary embodiments of the present disclosure and descriptions thereof are used for explaining the present disclosure, and do not constitute any inappropriate limitation to the present disclosure. In the figures.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, in the specification, claims, and accompanying drawings of the present disclosure, the terms "first", "second", and the like are intended to distinguish between similar objects rather than describe a specific order or sequence. It should be understood that the data termed in such a way is interchangeable in proper circumstances, so that the embodiments of the present disclosure described herein can be implemented in orders except the order illustrated or described herein. Moreover, the terms "include", "contain" and any other variants mean to cover the non-exclusive inclusion. For example, a process, method, system, product, or device that includes a list of steps or units is not necessarily limited to the steps or units expressly listed, but may include other steps or units not expressly listed or inherent to such a process, method, product, or device.

Exemplary Embodiment 1

According to one embodiment of the present disclosure, a method embodiment of a media file delivery method is provided.

Figure 1:
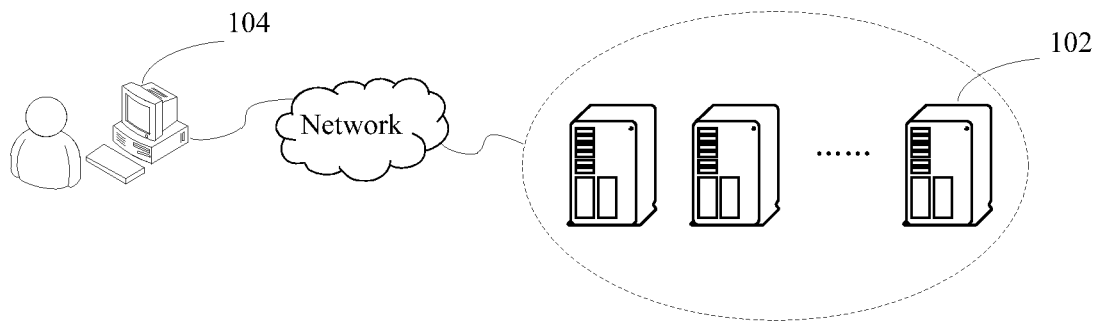
FIG. 1 is a schematic diagram of a hardware environment of a media file delivery method according to an embodiment of the present disclosure.

Optionally, in one embodiment, the media file delivery method may be applied to a hardware environment constituted by a server 102 and a terminal device 104 shown in FIG. 1. As shown in FIG. 1, the server 102 is connected to the terminal device 104 by using a network. The network includes but is not limited to: a wide area network, a metropolitan area network, or a local area network. The terminal device 104 is not limited to a personal computer (PC), a mobile phone, a tablet computer, or the like. The media file delivery method in one embodiment of the present disclosure may be performed by the server 102, or may be performed by the terminal device 104, or may be performed by the server 102 together with the terminal device 104. That the media file delivery method in one embodiment of the present disclosure is performed by the terminal device 104 may be that the media file delivery method is performed by a client installed on the terminal device 104.

Figure 2:
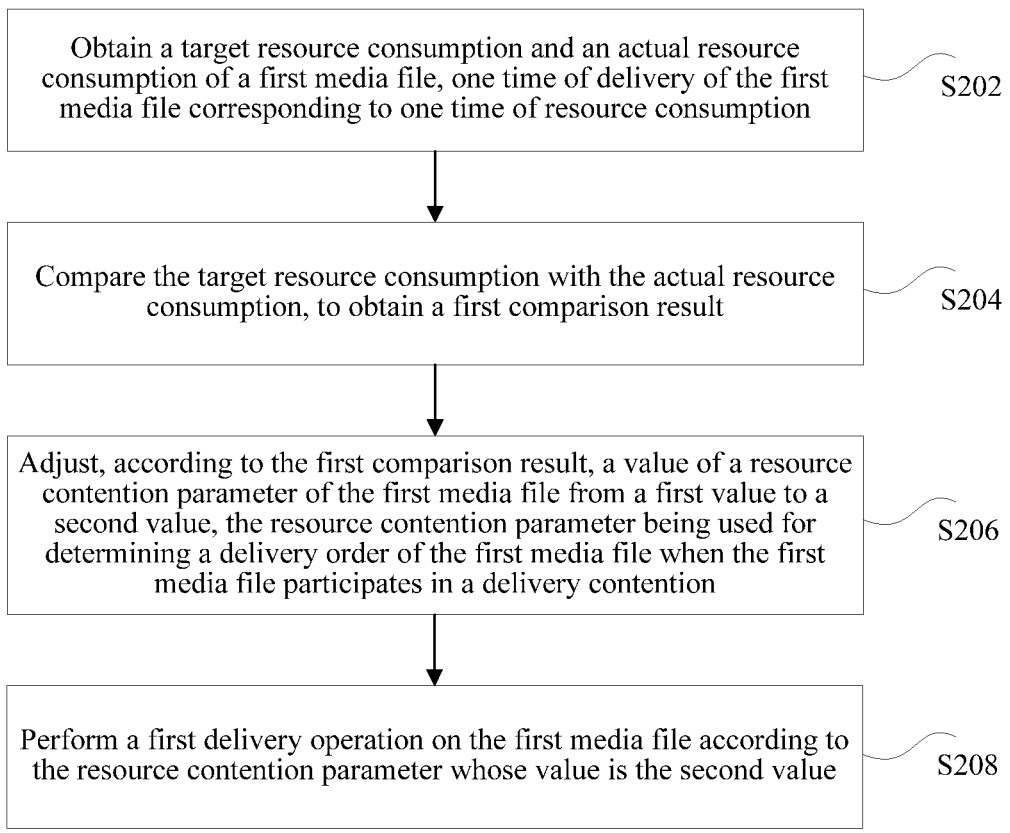
FIG. 2 is a flowchart of an optional media file delivery method according to an embodiment of the present disclosure.

FIG. 2 is a flowchart of an optional media file delivery method according to an embodiment of the present disclosure. As shown in FIG. 2, the method may include the following exemplary steps:

Step S202: Obtaining a target resource consumption and an actual resource consumption of a first media file, one time of delivery of the first media file corresponding to one time of resource consumption.

Step S204: Comparing the target resource consumption with the actual resource consumption, to obtain a first comparison result.

Step S206: Adjusting, according to the first comparison result, a value of a resource contention parameter of the first media file from a first value to a second value, the resource contention parameter being used for determining a delivery order of the first media file when the first media file participates in a delivery contention.

Step S208: Performing a first delivery operation on the first media file according to the resource contention parameter whose value is the second value.

According to step S202 to step S208, the target resource consumption is compared with the actual resource consumption of the first media file, the resource contention parameter is adjusted according to the comparison result, and the delivery operation is performed on the first media file according to the adjusted resource contention parameter. One time of delivery of the first media file corresponds to one time of resource consumption. The resource contention parameter may be used for determining a delivery order of the first media file when the first media file participates in a delivery contention. In this way, an objective of adjusting the delivery order of the first media file according to a delivery speed of the first media file is achieved, the technical problem in the related technology that a delivery speed of a bidding advertisement is excessively fast is resolved, and a technical effect of stabilizing the delivery speed of the first media file and increasing a delivery correlation of the first media file is achieved.

First, it should be noted that, a type of the media file is not specifically limited in one embodiment of the present disclosure. The media file may be a video file, an audio file, an image file, a text file or the like, or may be any combination of these types of files, for example, a combination of a text file and an image file, or a combination of a video file and a text file. A specific product form may be, for example, a video advertisement, a native advertisement, a banner advertisement, or a search advertisement.

In the technical solution provided in step S202, the first media file may be a to-be-delivered file. A type of the first media file is not specifically limited in one embodiment of the present disclosure. The first media file may be a video file, an audio file, an image file, a text file or the like. Resource consumption is caused in a delivery process of the first media file. For example, a resource consumed by delivering the first media file may be price of the media file.

One time of delivery of the first media file corresponds to one time of resource consumption. A resource consumption caused by each delivery of the first media file is not specifically limited in one embodiment of the present disclosure, and may be set or adjusted according to the type of the first media file or an actual requirement of delivering the first media file. It should further be noted that, during actual delivery, a resource consumption caused by each delivery of the first media file may be the same or may be different.

The target resource consumption of the first media file may be a pre-estimated total resource consumption caused by delivering the first media file or may be a total resource consumption that is caused by delivering the first media file and that is agreed by a delivery object. The actual resource consumption of the first media file may be a total resource consumption caused by delivering the first media file during actual delivery. In one embodiment of the present disclosure, the obtained target resource consumption and the actual resource consumption of the first media file are a target resource consumption and an actual resource consumption of the first media file from a delivery start time to a current time. The actual resource consumption of the first media file to the current time may be obtained by means of accumulation. Each time the first media file is delivered, a resource consumption caused by this delivery is recorded, so that the actual resource consumption of the first media file to the current time is a total resource consumption that is obtained by means of accumulation. It should be noted that the foregoing manner of obtaining the actual resource consumption of the first media file to the current time is only an optional embodiment of one embodiment of the present disclosure. Other manners may be used for obtaining the actual resource consumption of the first media file to the current time in one embodiment of the present disclosure, and the other manners are not described by way of example herein.

In an optional embodiment, the target resource consumption of the first media file to the current time may be determined according to an exposure chance curve of the first media file. It should be noted that, the exposure chance curve is used for counting a resource consumption that is caused by an online request for the first media file by a user and that is distributed according to time. A schedule system of the first media file may provide schedule information of the first media file. The schedule information of the first media file may include the following information: the delivery start time of the first media file, a delivery end time of the first media file, and a resource consumption of delivery of the first media file at each time point. The target resource consumption of the first media file to the current time may be calculated according to the following formula by using the exposure chance curve of the first media file:

$$\text{paced\_spending} = \frac{\int_{t_{start}}^{t_{curr}} c(t)dt}{\int_{t_{start}}^{t_{end}} c(t)dt} \times \text{Budget}$$

c(t) is the exposure chance curve of the first media file, $t_{start}$ is the delivery start time of the first media file, $t_{end}$ is the delivery end time of the first media file, $t_{curr}$ is the current time, Budget is a total resource consumption of delivering the first media file, and paced_spending is the target resource consumption of the first media file from the delivery start time to the current time.

It should be noted that, the foregoing manner of obtaining the target resource consumption of the first media file to the current time is only an optional embodiment of one embodiment of the present disclosure. Other manners may be used for obtaining the target resource consumption of the first media file to the current time in one embodiment of the present disclosure, and the other manners are not described by way of example herein. In this optional embodiment, the exposure chance curve of the first media file is used for obtaining the target resource consumption of the first media file to the current time. Compared with other obtaining manners, the exposure chance curve obtained according to pulling of a user is relatively convenient, and the exposure chance curve can accurately reflect a delivery process of the first media file. Therefore, to obtain the target resource consumption of the first media file to the current time by using the exposure chance curve is relatively convenient and effective, and the accuracy of the obtained target resource consumption can be ensured.

In one embodiment of the present disclosure, manners of obtaining the target resource consumption and the actual resource consumption of the first media file are not specifically limited. Any variation manner or redelivery manner capable of obtaining the target resource consumption and the actual resource consumption of the first media file to the current time shall fall within the protection scope of the present disclosure.

In the technical solution provided in step S204, after the target resource consumption and the actual resource consumption of the first media file to the current time are obtained in step S202, in one embodiment of the present disclosure, the obtained the target resource consumption and the actual resource consumption may be compared with each other, to obtain a quantitative relationship between the target resource consumption and the actual resource consumption, thereby obtaining a first comparison result. It should be noted that, the first comparison result may include the following cases: The actual resource consumption is less than the target resource consumption; the actual resource consumption is greater than the target resource consumption; the actual resource consumption is equal to the target resource consumption. The foregoing three cases may reflect the delivery speed of the first media file. For example, when the actual resource consumption is less than the target resource consumption, it indicates that the delivery speed of the first media file is excessively slow; when the actual resource consumption is greater than the target resource consumption, it indicates that the delivery speed of the first media file is excessively fast; when the actual resource consumption is equal to the target resource consumption, it indicates that the delivery speed of the first media file is suitable, and delivering the first media file at this delivery speed can ensure that a total resource consumption of delivering the first media file from the delivery start time to the delivery end time is the same as a pre-agreed total resource consumption of delivering the first media file. By comparing the actual resource consumption with the target resource consumption, the delivery speed of the first media file can be controlled according to the first comparison result.

Optionally, the first comparison result obtained by comparing the target resource consumption with the actual resource consumption may further include a difference between the actual resource consumption and the target resource consumption, that is, a numerical value by which the actual resource consumption is less than the target resource consumption when the actual resource consumption is less than the target resource consumption, or a numerical value by which the actual resource consumption is greater than the target resource consumption when the actual resource consumption is greater than the target resource consumption. By obtaining the difference between the actual resource consumption and the target resource consumption, the delivery speed of the first media file can be adjusted more accurately.

In the technical solution provided in step S206, the resource contention parameter of the first media file may be used for determining a delivery order of the first media file when the first media file participates in a delivery contention. In a process in which the first media file participates in a delivery contention, the resource contention parameter of the first media file may be correspondingly adjusted according to the first comparison result, to stabilize the delivery speed of the first media file, and ensure that the first media file is delivered at a constant speed, thereby increasing exposure of the first media file. In one embodiment of the present disclosure, the resource contention parameter of the first media file may be adjusted from a first value to a second value according to the first comparison result. It should be noted that a magnitude relationship between the first value and the second value may be determined according to the first comparison result, that is, a value of the resource contention parameter of the first media file may be increased or reduced according to the first comparison result. It should further be noted that, the delivery order of the first media file may be determined by the value of the resource contention parameter. A delivery order of the first media file determined by a larger value of the resource contention parameter is earlier; a delivery order of the first media file determined by a smaller value of the resource contention parameter is later.

The adjusting the value of the resource contention parameter of the first media file according to the first comparison result may be described in detail by using the following optional embodiment. Specifically:

The adjusting, according to the first comparison result, a value of a resource contention parameter of the first media file from a first value to a second value in the exemplary step S206 may include:

Step S2062: When the first comparison result indicates that the actual resource consumption of the first media file is less than the target resource consumption, increasing the value of the resource contention parameter of the first media file from the first value to the second value. In this case, the second value is greater than the first value, and a delivery order determined by the first value is later than a delivery order determined by the second value.

Step S2064: When the first comparison result indicates that the actual resource consumption of the first media file is greater than the target resource consumption, reducing the value of the resource contention parameter of the first media file from the first value to the second value. In this case, the second value is less than the first value, and a delivery order determined by the first value is earlier than a delivery order determined by the second value.

It should be noted that, when the actual resource consumption of the first media file is the same as the target resource consumption, it indicates that the delivery speed of the first media file is suitable, and the first media file can be ensured to be delivered at a constant speed. In this case, the value of the resource contention parameter of the first media file does not need to be adjusted. When the actual resource consumption of the first media file is different from the target resource consumption (including when the actual resource consumption is less than the target resource consumption and when the actual resource consumption is greater than the target resource consumption), it indicates that the delivery speed of the first media file is excessively fast or slow, and the first media file cannot be ensured to be delivered at a constant speed, so that the delivery speed of the first media file needs to be correspondingly adjusted. Because the delivery order of the first media file can be determined by the value of the resource contention parameter, and the delivery speed of the first media file can be directly affected by the delivery order, the media file whose delivery order is earlier is correspondingly preferentially delivered, and correspondingly has a faster delivery speed. In addition, because a resource consumption is caused each time the first media file is delivered, when the actual resource consumption of the first media file is greater than the target resource consumption, it indicates that the delivery speed of the first media file exceeds a predetermined speed. In this case, the value of the resource contention parameter of the first media file needs to be correspondingly reduced, so that the delivery order of the first media file is later, and the delivery speed of the first media file is reduced, thereby ensuring that the first media file is delivered at a constant predetermined speed. When the actual resource consumption of the first media file is less than the target resource consumption, it indicates that the delivery speed of the first media file is slower than a predetermined speed. In this case, the value of the resource contention parameter of the first media file needs to be correspondingly increased, so that the delivery order of the first media file is earlier, and the delivery speed of the first media file is increased, thereby ensuring that the first media file is delivered at a constant predetermined speed.

In an optional embodiment, the resource contention parameter of the first media file may be adjusted according to the following formula:

$$paced\_bid = \begin{cases} paced\_bid \times \beta^+, & \text{actual resource consumption} \\ & \text{is less than target resource consumption} \\ paced\_bid \times \beta^-, & \text{actual resource consumption} \\ & \text{is greater than target resource consumption} \end{cases}.$$

paced_bid is the resource contention parameter of the first media file, $\beta^+$ is a first coefficient, $\beta^+ > 1$, $\beta^-$ is a second coefficient, and $\beta^- < 1$.

It should be noted that, an initial value of the resource contention parameter of the first media file may be a bid_price whose value may be determined according to an actual requirement. A change interval of $$\frac{paced\_bid}{bid\_price}$$

may be [0.5, 1]. $\beta^-$ is a coefficient greater than 1 and may be 1.05, and $\beta^-$ may be a coefficient less than 1 and may be 0.95. It should be noted that, the values of the foregoing parameters are an optional embodiment of the present disclosure. The values of the foregoing parameters may further be adjusted according to a case. The values are not described by way of example herein.

It should be noted that, the manner of adjusting the resource contention parameter of the first media file according to the first comparison result described above is only an optional embodiment of the present disclosure. Other manners may be used for adjusting the resource contention parameter of the first media file in one embodiment of the present disclosure, and the other manners are not described by way of example herein. In one embodiment of the present disclosure, the value of the resource contention parameter of the first media file is adjusted according to the first comparison result, to adjust the delivery order of the first media file and adjust the delivery speed of the first media file, so that the first media file can be delivered at a constant predetermined speed and exposure of the first media file is increased.

Optionally, in the process of adjusting the resource contention parameter of the first media file according to the first comparison result, in one embodiment of the present disclosure, the value of the resource contention parameter may be reduced by a first proportion when the first comparison result indicates that the actual resource consumption of the first media file is greater than a predetermined threshold of the target resource consumption; the value of the resource contention parameter may be increased by a second proportion when the first comparison result indicates that the actual resource consumption of the first media file is less than the predetermined threshold of the target resource consumption. The first proportion and the second proportion may be set or adjusted according to an actual requirement. In one embodiment of the present disclosure, the resource contention parameter is adjusted only when the actual resource consumption of the first media file is greater or less than the predetermined threshold of the target resource consumption. In this way, a problem that system consumption is increased due to frequent adjustment of the resource contention parameter can be avoided. In addition, a predetermined threshold is set, and the predetermined threshold may be adjusted according to an actual requirement, so that the value of the resource contention parameter can be ensured to be immediately adjusted when an adjustment condition is satisfied, thereby improving delivery efficiency of the first media file.

In this optional embodiment, a correlation parameter of a media file is calculated, and a priority of a delivery order of the media file may be adjusted according to the correlation parameter, so that a media file having a higher correlation with a delivery object is preferentially delivered. In this way, exposure of the multimedia is increased, and delivery efficiency of the media file is improved. In one embodiment of the present disclosure, a value of the correlation parameter of the media file is adjusted according to a comparison result between an actual delivery volume and a target delivery volume of the media file. In this way, a delivery order the media file can be adjusted, and a media file having a higher correlation with the delivery object can be preferentially delivered, and a media file having a lower correlation with the delivery object can be delivered later, thereby increasing an exposure rate of a media file, and improving delivery efficiency of the media file.

It should be noted that, this optional embodiment may be considered as a 0-1 pacing solution for a media file. The media file delivery method corresponding to the exemplary step S202 to step S208 in one embodiment of the present disclosure may be considered as a price adjustment pacing solution for the media file. The 0-1 pacing and the price adjustment pacing represent two different states and can be converted into each other. It should be noted that state conversion is performed by comparing an actual resource consumption and a target resource consumption of the media file. To change the 0-1 pacing into the price adjustment pacing, a resource contention parameter paced_bid is adjusted, and a delivery probability is restored to 1 for delivery. To change the price adjustment pacing into the 0-1 pacing, a former resource contention parameter paced_bid is maintained and then a value of a delivery probability is adjusted.

In the technical solution provided in the exemplary step S208, the resource contention parameter of the first media file may affect a correlation between the first media file and the delivery object. The correlation between the first media file and the delivery object of the first media file may be directly represented by a correlation parameter of the first media file. A greater correlation parameter of the first media file indicates a higher correlation between the first media file and the delivery object; a smaller correlation parameter of the first media file indicates a lower correlation between the first media file and the delivery object. It should be noted that correlations between a plurality of different media files and a same delivery object may be different, and correlations between a same media file and different delivery objects may be different. When a delivery request issued by the delivery object is received, the delivery order of the first media file may be determined by the correlation parameter between the first media file and the delivery object. A higher correlation between the first media file and the delivery object indicates an earlier delivery order, and a lower correlation between the first media file and the delivery object indicates a later delivery order. It should be noted that, a higher resource contention parameter of the first media file corresponds to a higher correlation parameter of the first media file, so that the delivery order of the first media file is earlier; a lower resource contention parameter of the first media file corresponds to a lower correlation parameter of the first media file, so that the delivery order of the first media file is later.

After the adjusted resource contention parameter of the first media file is obtained in exemplary step S206, that is, when the value of the resource contention parameter is the second value, in one embodiment of the present disclosure, the first delivery operation that may be performed on the first media file according to the resource contention parameter may include but is not limited to: obtaining a correlation parameter of the first media file corresponding to the resource contention parameter according to the resource contention parameter, and then determining, according to the correlation parameter of the first media file and correlation parameters of other media files participating in the delivery contention, one or more media files whose delivery orders are earlier to be delivered.

In an optional embodiment, the performing a first delivery operation on the first media file according to the resource contention parameter whose value is the second value in exemplary step S208 may include the following exemplary steps:

A first step of step S208 may include: receiving a first delivery request, the first delivery request containing information used for representing a first delivery object.

In the technical solution provided in the above-described step, the first delivery request may be used for requesting a server to deliver a media file. It should be noted that a type of the media file delivered by the server is not specifically limited in one embodiment of the present disclosure. The media file requested by the first delivery request to be delivered may include the first media file. The first delivery request may be issued by a client. The client may be in a communication connection in a wired or a wireless manner to the server. It should be noted that, a trigger operation triggering the client to issue the first delivery request is not specifically limited in one embodiment of the present disclosure. For example, the trigger operation triggering the client to issue the first delivery request may include but is not limited to the following types: A user of the client clicks on any media file, the client downloads and installs any application, the client logs in to and uses any application, or the like. The types are not described by way of example herein. It should further be noted that, the client issuing the first delivery request may be any terminal device such as a mobile phone or a computer, or may be any application client, such as an instant messaging application client or browser application client. The client issuing the first delivery request may be considered as a delivery object of the to-be-delivered media file, and is a first delivery object herein.

It should further be noted that, the first delivery request may include but is not limited to the following information: information about the first delivery object, that is, information about the client issuing the first delivery request, including an identifier of the client, an address of the client, and the like; the type of the requested media file, which may include a video file, an audio file, an image file, and the like; a delivery form of the requested media file, which may include message pushing, pop-up window using, and the like. The first delivery request may further include other information. The other information is not described by way of example herein.

Obtaining A second step of step S208 may include: obtaining a first correlation parameter of the first media file corresponding to the resource contention parameter whose value is the second value, the first correlation parameter being used for indicating a correlation between the first media file and the first delivery object.

In the technical solution provided in exemplary above-described step, the correlation between the first media file and the first delivery object may be represented by the first correlation parameter of the first media file. The first correlation parameter is related to the resource contention parameter of the first media file, and a greater resource contention parameter of the first media file indicates a greater first correlation parameter; a smaller resource contention parameter of the first media file indicates a smaller first correlation parameter. Optionally, after the resource contention parameter of the first media file is adjusted to the second value according to the first comparison result, a corresponding first correlation parameter may be obtained according to the resource contention parameter. A manner of obtaining the first correlation parameter of the first media file according to the resource contention parameter is not specifically limited in one embodiment of the present disclosure. The manner may be increasing or reducing the first correlation parameter by a predetermined proportion, or other manners may be used. The other manners are not described by way of example herein.

A third step of step S208 may include: selecting, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

In the technical solution provided in exemplary above-described step, the second media file may be one or more media files participating in a delivery contention corresponding to the first delivery request. The second correlation parameter may be a correlation parameter of each media file of the second media file. The second or the second media file herein may be a generic term of a plurality of media files. After the first correlation parameter is obtained, the first correlation parameter is considered together with the second correlation parameter of the another to-be-delivered second media file participating in the delivery contention of the first delivery request, delivery orders of the first media file and the second media file are determined according to the first correlation parameter and the second correlation parameter, and one or more target media files whose delivery orders are earlier are selected from the first media file and the second media file to perform the delivery requested by the first delivery request.

It should be noted that, the first delivery operation in this optional embodiment is, in view of the first delivery request, determining delivery orders of delivering the first media file and other media files to the first delivery object according to correlation parameters of the first media file and the other media files, and selecting one or more target media files whose delivery orders are earlier to perform the delivery requested by the first delivery request. In this optional embodiment, the media files are delivered according to the correlation parameters of the media files, so that the correlations between the delivered media files and the delivery object is increased, and delivery correlations of the delivered media files are increased.

Figure 3:
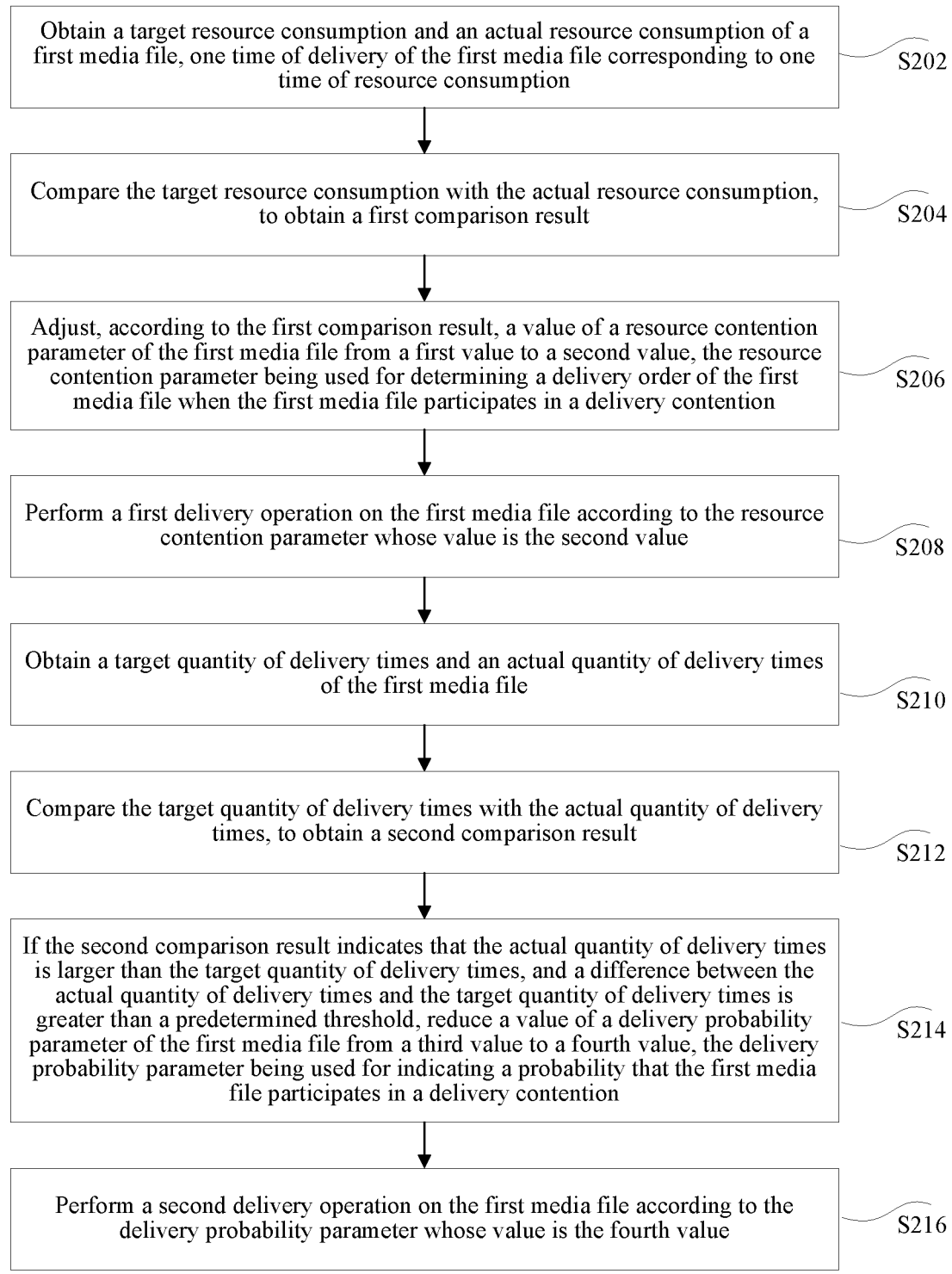
FIG. 3 is a flowchart of another optional media file delivery method according to an embodiment of the present disclosure.

In an optional embodiment, as shown in FIG. 3, after the performing a first delivery operation on the first media file according to the resource contention parameter whose value is the second value in exemplary step S208, this optional embodiment may further include the following exemplary steps:

Step S210: Obtaining a target delivery volume and an actual delivery volume of the first media file.

In the technical solution provided in exemplary step S210, the target delivery volume of the first media file is a required delivery volume pre-agreed by the delivery object, and the actual delivery volume of the first media file is an actual delivery volume to a delivery object. After the first delivery operation is performed on the first media file in exemplary step S202 to step S208, the actual delivery volume of the first media file to the current time may be recorded by using a counter. 1 is added to the counter each time the first media file is delivered, so that the actual delivery volume of the first media file to the current time is a count on the counter. The target delivery volume of the first media file to the current time may be determined according to the exposure chance curve of the first media file, and the target delivery volume of the first media file to the current time may be specifically calculated according to the following formula:

$$\text{paced\_exp } o = \frac{\int_{t_{start}}^{t_{curr}} c(t)dt}{\int_{t_{start}}^{t_{end}} c(t)dt} \times \exp o\_num$$

$c(t)$ is the exposure chance curve of the first media file, $t_{start}$ is the delivery start time of the first media file, $t_{end}$ is the delivery end time of the first media file, $t_{curr}$ is the current time, expo_num is a required total delivery volume of the first media file, and paced_expo is the target delivery volume of the first media file from the delivery start time to the current time.

It should be noted that, in one embodiment of the present disclosure, manners of obtaining the target delivery volume and the actual delivery volume of the first media file are not specifically limited. Any variation manner or redelivery manner capable of obtaining the target delivery volume and the actual delivery volume of the first media file to the current time shall fall within the protection scope of the present disclosure.

Step S212: Comparing the target delivery volume with the actual delivery volume, to obtain a second comparison result.

In the technical solution provided in exemplary step S212, after the target delivery volume and the actual delivery volume of the first media file to the current time are obtained, in one embodiment of the present disclosure, the obtained target delivery volume and the actual delivery volume may be compared with each other, to obtain a magnitude relationship between the target delivery volume and the actual delivery volume, thereby obtaining a second comparison result. It should be noted that, the second comparison result may include the following cases: The actual delivery volume is less than the target delivery volume; the actual delivery volume is larger than the target delivery volume; the actual delivery volume is equal to the target delivery volume. The foregoing three cases may reflect the delivery speed of the first media file. For example, when the actual delivery volume is less than the target delivery volume, it indicates that the delivery speed of the first media file is excessively slow; when the actual delivery volume is larger than the target delivery volume, it indicates that the delivery speed of the first media file is excessively fast; when the actual delivery volume is equal to the target delivery volume, it indicates that the delivery speed of the first media file is suitable, and the pre-agreed and required total delivery volume may be reached from the delivery start time to the delivery end time by delivering the first media file at this delivery speed. By comparing the actual delivery volume with the target delivery volume, the delivery speed of the first media file can be controlled according to the comparison result.

Optionally, the second comparison result obtained by comparing the target delivery volume with the actual delivery volume may further include a difference between the actual delivery volume and the target delivery volume. That is, when the actual delivery volume is less than the target delivery volume, the second comparison result may further include a numerical value by which the actual delivery volume is less than the target delivery volume; when the actual delivery volume is larger than the target delivery volume, the second comparison result may further include a numerical value by which the actual delivery volume is larger than the target delivery volume. By obtaining the difference between the actual delivery volume and the target delivery volume, the delivery speed of the first media file can be adjusted more accurately.

Step S214: When the second comparison result indicates that the actual delivery volume is larger than the target delivery volume, and a difference between the actual delivery volume and the target delivery volume is greater than a predetermined threshold, reducing a value of a delivery probability parameter of the first media file from a third value to a fourth value, the delivery probability parameter being used for indicating a probability that the first media file participates in a delivery contention.

In the technical solution provided in exemplary step S214, when the second comparison result indicates that the actual delivery volume of the first media file is greater than the target delivery volume, and a difference between the actual delivery volume and the target delivery volume is greater than a predetermined threshold, where the predetermined threshold may be determined according to an actual requirement, in this optional embodiment, a value of a delivery probability parameter of the first media file is reduced from a third value to a fourth value. The delivery probability parameter may be used for indicating a probability that the first media file participates in a delivery contention. The fourth value is less than the third value. A greater delivery probability parameter indicates a greater probability that the first media file participates in a delivery contention, that is, the first media file is more likely to be delivered to a delivery object; a smaller delivery probability parameter indicates a smaller probability that the first media file participates in a delivery contention, that is, the first media file is less likely to be delivered to a delivery object. It should be noted that, a value range of the delivery probability parameter may be [0, 1]. In this optional embodiment, the delivery probability parameter of the first media file is reduced when the delivery speed of the first media file is excessively fast, so that a probably that the first media file is delivered is reduced, and the delivery speed of the first media file is reduced, thereby ensuring that the first media file is delivered at a constant predetermined speed, to improve exposure of the first media file.

Optionally, when the second comparison result indicates that the actual delivery volume is larger than the target delivery volume, and a difference between the actual delivery volume and the target delivery volume is greater than a predetermined threshold, the value of the delivery probability parameter of the first media file may be adjusted according to the following formula: $p=p\times\theta$. p is the delivery probability parameter of the first media file, $\theta$ is an adjustment coefficient, and $0<\theta<1$. It should be noted that, a value of $\theta$ may be set according to an actual requirement, and an initial value of p may be 1. When the delivery speed of the first media file is excessively fast, the delivery probability parameter of the first media file is correspondingly reduced. For example, $\theta$ may be 0.95, so that $p=p\times0.95$.

Step S216: Performing a second delivery operation on the first media file according to the delivery probability parameter whose value is the fourth value.

In the technical solution provided in exemplary step S216, after the delivery probability parameter of the first media file is adjusted, a second delivery operation may be performed on the first media file according to the adjusted delivery probability parameter, that is, the delivery probability parameter whose value is the fourth value.

Figure 4:
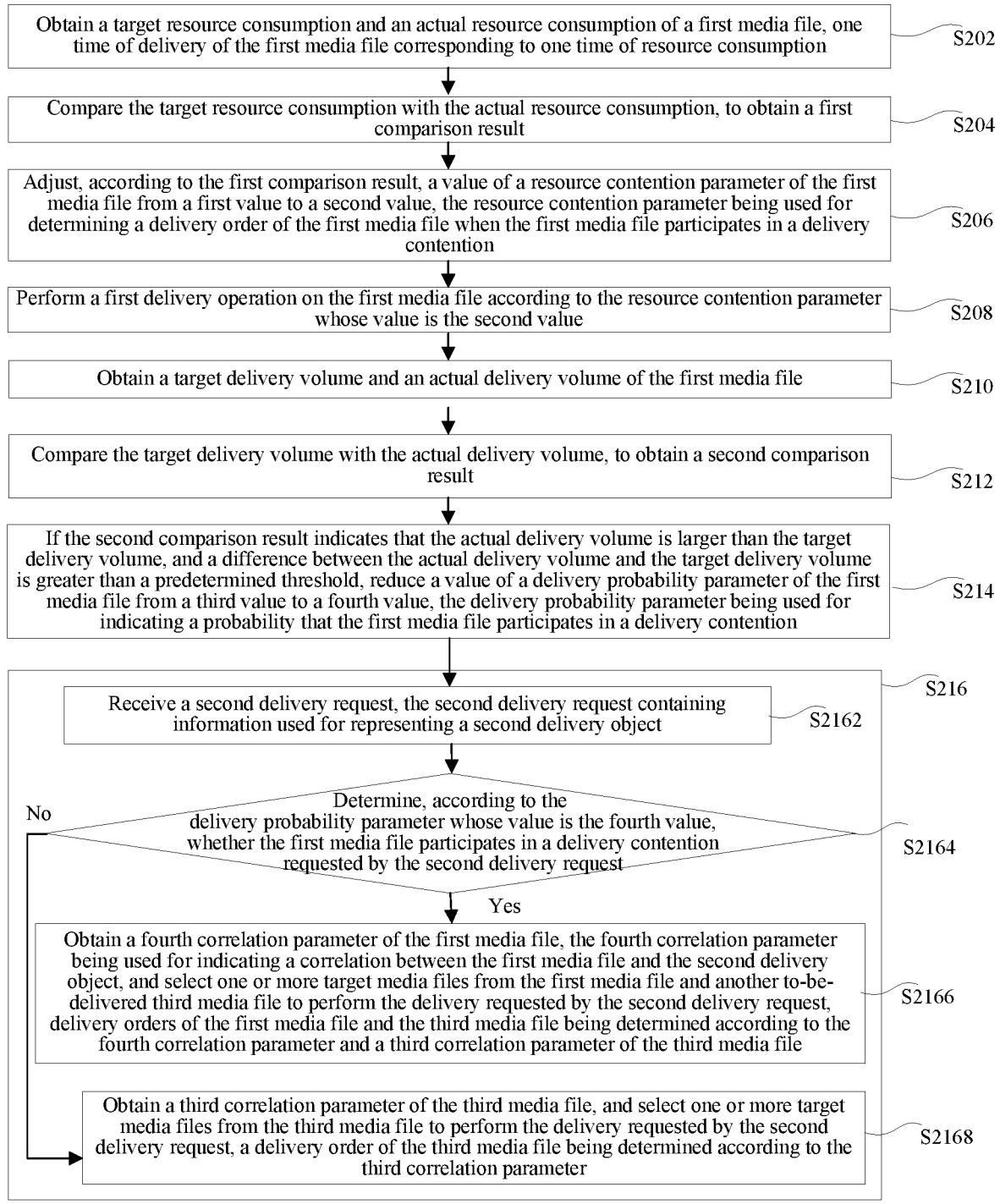
FIG. 4 is a flowchart of still another optional media file delivery method according to an embodiment of the present disclosure.

In an optional embodiment, as shown in FIG. 4, step S216 may include the following exemplary steps:

Step S2162: Receiving a second delivery request, the second delivery request containing information used for representing a second delivery object.

In the technical solution provided in exemplary step S2162, the second delivery request may be used for requesting a server to deliver a media file. It should be noted that a type of the media file delivered by the server is not specifically limited in one embodiment of the present disclosure. The media file requested by the second delivery request to be delivered may include the first media file. The second delivery request may be issued by a client. The client may be in a communication connection in a wired or a wireless manner to the server. It should be noted that, a trigger operation triggering the client to issue the second delivery request is not specifically limited in one embodiment of the present disclosure. For example, the trigger operation triggering the client to issue the second delivery request may include but is not limited to the following types: A user of the client clicks on any media file, the client downloads and installs any application, the client logs in to and uses any application, or the like. The types are not described by way of example herein. It should further be noted that, the client issuing the second delivery request may be any terminal device such as a mobile phone or a computer, or may be any application client, such as an instant messaging application client or browser application client. The client issuing the second delivery request may be considered as a delivery object of the to-be-delivered media file, and is a second delivery object herein.

It should further be noted that, the second delivery request may include but is not limited to the following information: information about the second delivery object, that is, information about the client issuing the second delivery request, including an identifier of the client, an address of the client, and the like; the type of the requested media file, which may include a video file, an audio file, an image file, and the like; a delivery form of the requested media file, which may include message pushing, pop-up window using, and the like. The second delivery request may further include other information. The other information is not described by way of example herein.

Step S2164: Determining, according to the delivery probability parameter whose value is the fourth value, whether the first media file participates in a delivery contention requested by the second delivery request.

In the technical solution provided in exemplary step S2164, the delivery probability parameter can determine whether the first media file can participate in a delivery contention requested by the second delivery request, and determine a probability that the first media file participates in the delivery contention requested by the second delivery request. For example, the fourth value may be 0, so that the delivery probability parameter of the first media file is 0, and it indicates that the probability that the first media file participates in the delivery contention requested by the second delivery request is 0, that is, the first media file cannot participate in the delivery contention requested by the second delivery request. The fourth value may alternatively be 1, so that the delivery probability parameter of the first media file is 1, and it indicates that the probability that the first media file participates in the delivery contention requested by the second delivery request is 1, that is, the first media file can participate in the delivery contention requested by the second delivery request. The fourth value may alternatively be 0.4, so that the delivery probability parameter of the first media file is 0.4, and it indicates that the probability that the first media file participates in the delivery contention requested by the second delivery request is 0.4, that is, the probability that the first media file participates in the delivery contention requested by the second delivery request is 40%, and a probability that the first media file does not participate in the delivery contention requested by the second delivery request is 60%. It should be noted that, the probability delivery parameter only represents a probability that the first media file participates in the delivery contention requested by the second delivery request. A greater delivery probability parameter indicates a greater probability that the first media file can participate in the delivery contention requested by the second delivery request; a smaller delivery probability parameter indicates a smaller probability that the first media file can participate in the delivery contention requested by the second delivery request.

Step S2166: When the first media file participates in the delivery contention requested by the second delivery request, obtaining a fourth correlation parameter of the first media file, the fourth correlation parameter being used for indicating a correlation between the first media file and the second delivery object, and selecting one or more target media files from the first media file and another to-be-delivered third media file to perform the delivery requested by the second delivery request, delivery orders of the first media file and the third media file being determined according to the fourth correlation parameter and a third correlation parameter of the third media file.

In the technical solution provided in exemplary step S2166, when the first media file can participate in the delivery contention requested by the second delivery request, the second delivery operation is performed on the first media file. This may specifically include: obtaining a fourth correlation parameter of the first media file. It should be noted that, the fourth correlation parameter may be used for indicating a correlation between the first media file and the second delivery object. A greater fourth correlation parameter indicates a higher correlation between the first media file and the second delivery object; a smaller fourth correlation parameter indicates a lower correlation between the first media file and the second delivery object. Then, according to the fourth correlation parameter of the first media file and a third correlation parameter of another to-be-delivered third media file participating in the delivery contention requested by the second delivery request, delivery orders of the first media file and the another to-be-delivered third media file for the second delivery object are determined. It should be noted that, the to-be-delivered third media file may be one or more media files participating in a delivery contention corresponding to the second delivery request. The third correlation parameter may be a correlation parameter of each media file of the third media file. The third or the third media file herein may be a generic term of a plurality of media files. After the delivery orders of the first media file and the third media file are determined according to the fourth correlation parameter and the third correlation parameter, one or more target media files whose delivery orders are earlier nay be selected from the first media file and the third media file to perform the delivery requested by the second delivery request.

Step S2168: When the first media file does not participate in the delivery contention requested by the second delivery request, obtaining a third correlation parameter of the third media file, and selecting one or more target media files from the third media file to perform the delivery requested by the second delivery request, a delivery order of the third media file being determined according to the third correlation parameter.

In the technical solution provided in exemplary step S2168, when the first media file does not participate in the delivery contention requested by the second delivery request, the first media file is forbidden to participate in the delivery requested by the second delivery request when responding to the second delivery request, while the another to-be-delivered third media file is allowed to participate in the delivery requested by the second delivery request. When the delivery requested by the second delivery request is performed on the another to-be-delivered third media file, the third correlation parameter of the third media file may be obtained first. This means to obtain correlation parameters of a plurality of media files whose generic term is the third media file. A correlation between each media file and the second delivery object may be determined by a correlation parameter of the media file. A delivery order of the media file to be delivered to the second delivery object may be determined according to a value of the correlation parameter of the media file, and a larger value of the correlation parameter indicates an earlier delivery order determined; a smaller value of the correlation parameter indicates a later delivery order determined. After the delivery orders of the plurality of media files of the third media file are determined according to the correlation parameters of the media files, one or more target media files whose delivery orders are earlier may be selected from the plurality of media files of the third media file to perform the delivery requested by the second delivery request.

It should be noted that, in this optional embodiment, whether the first media file participates in a delivery contention requested by the second delivery request is determined according to the delivery probability parameter; and when the first media file participates in the delivery contention requested by the second delivery request, one or more target media files whose delivery orders are earlier are selected from the first media file and another to-be-delivered third media file according to the correlation parameter of the first media file and a correlation parameter of the another to-be-delivered third media file to perform the delivery requested by the second delivery request; or when the first media file does not participate in the delivery contention requested by the second delivery request, one or more target media files whose delivery orders are earlier are selected, according to a correlation parameter of the another to-be-delivered third media file, from the another to-be-delivered third media file to perform the delivery requested by the second delivery request. By means of this optional embodiment, an excessively fast delivery speed of a media file may be adjusted to be reduced, so that the media file may be delivered at a constant speed. In addition, the media file is delivered to a delivery object according to a correlation parameter, so that a correlation between the delivered media file and the delivery object may be increased, thereby increasing exposure of the delivered media file.

It should further be noted that, specific methods of obtaining the correlation parameters of the media files (including the first media file, the second media file, and the third media file) may be the same. The correlation parameters may be adjusted according to the delivery speeds of the media files, and when the delivery speeds are excessively fast, the correlation parameter may be reduced; when the delivery speeds are excessively slow, the correlation parameter may be increased. It should be noted that, manners of adjusting the correlation parameters of the media files are not specifically limited in one embodiment of the present disclosure, and are not described by way of example herein.

It should be noted that for each of the foregoing method embodiments, for ease of description, the method embodiment is described as a series of action combinations, but a person skilled in the art should know that the present disclosure is not limited to an order of the described actions because according to the present disclosure, some steps may use another order or be performed at the same time. In addition, a person skilled in the art should know that all embodiments described in the specification are preferred embodiments, and the actions and modules herein are not necessarily required in the present disclosure.

According to the descriptions of the foregoing implementations, a person skilled in the art may clearly learn that the method in the foregoing embodiments may be implemented by using software plus a necessary common hardware platform or by using hardware, but the former one is a preferred implementation in many cases. Based on such an understanding, the technical solutions in the present disclosure essentially, or the part contributing to the existing technology may be implemented in a form of a software product. The computer software product is stored in a storage medium (such as a read-only memory (ROM)/random access memory (RAM), a magnetic disk, or an optical disk) and includes several instructions for instructing a terminal device (which may be a personal computer, a server, a network device, or the like) to perform the methods in the embodiments of the present disclosure.

Exemplary Embodiment 2

Figure 5:
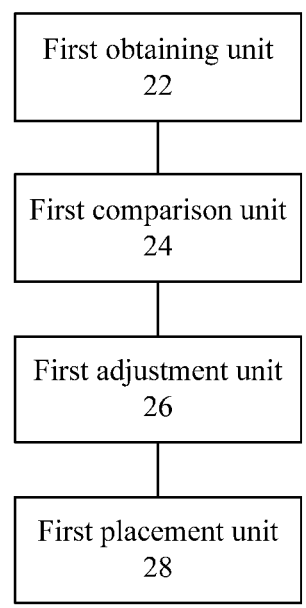
FIG. 5 is a schematic diagram of an optional media file delivery apparatus according to an embodiment of the present disclosure.

According to one embodiment of the present disclosure, a media file delivery apparatus for performing the foregoing media file delivery method is further provided. FIG. 5 is a schematic diagram of an optional media file delivery apparatus according to an embodiment of the present disclosure. As shown in FIG. 5, the apparatus may include:

a first obtaining unit 22, configured to obtain a target resource consumption and an actual resource consumption of a first media file, one time of delivery of the first media file corresponding to one time of resource consumption; a first comparison unit 24, configured to compare the target resource consumption with the actual resource consumption, to obtain a first comparison result; a first adjustment unit 26, configured to adjust, according to the first comparison result, a value of a resource contention parameter of the first media file from a first value to a second value, the resource contention parameter being used for determining a delivery order of the first media file when the first media file participates in a delivery contention; and a first delivery unit 28, configured to perform a first delivery operation on the first media file according to the resource contention parameter whose value is the second value.

It should be noted that, the first obtaining unit 22 in one embodiment may be configured to perform exemplary step S202 in exemplary Embodiment 1 of the present disclosure, the first comparison unit 24 in one embodiment may be configured to perform exemplary step S204 in exemplary Embodiment 1 of the present disclosure, the first adjustment unit 26 in one embodiment may be configured to perform step S206 in exemplary Embodiment 1 of the present disclosure, and the first delivery unit 28 in one embodiment may be configured to perform step S208 in Exemplary Embodiment 1 of the present disclosure.

It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

Figure 6:
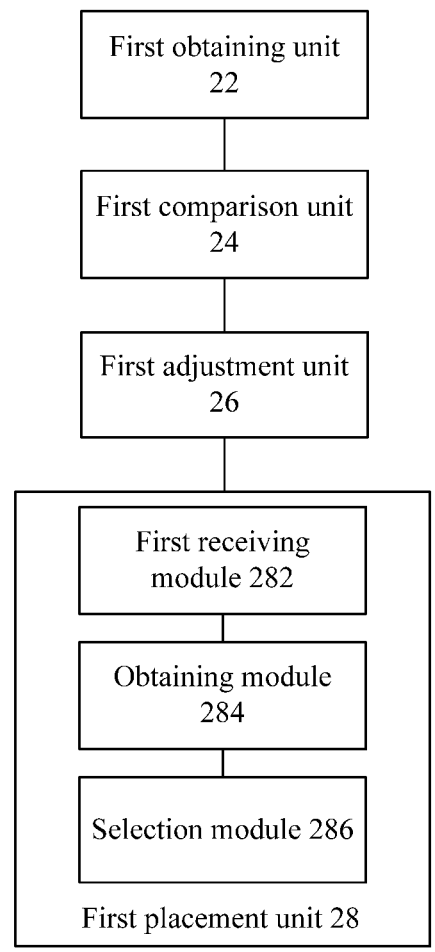
FIG. 6 is a schematic diagram of another optional media file delivery apparatus according to an embodiment of the present disclosure.

In an optional embodiment, FIG. 6 is a schematic diagram of another optional media file delivery apparatus according to an embodiment of the present disclosure. As shown in FIG. 6, the first delivery unit 28 may include: a first receiving module 282, configured to receive a first delivery request, the first delivery request containing information used for representing a first delivery object; an obtaining module 284, configured to obtain a first correlation parameter of the first media file corresponding to the resource contention parameter whose value is the second value, the first correlation parameter being used for indicating a correlation between the first media file and the first delivery object; and a selection module 286, configured to select, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

It should be noted that, the first receiving module 282 in one embodiment may be configured to perform the exemplary first step in step S208 in exemplary Embodiment 1 of the present disclosure, the obtaining module 284 in one embodiment may be configured to perform the exemplary second step in step S208 in exemplary Embodiment 1 of the present disclosure, and the selection module 286 in one embodiment may be configured to perform the exemplary third step in step S208 in exemplary Embodiment 1 of the present disclosure.

It should be noted that, examples and application scenarios of the foregoing modules are the same as those implemented in the corresponding steps, but are not limited to the content disclosed in Exemplary Embodiment 1. It should be noted that, the modules as a part of the apparatus may run in the hardware environment shown in FIG. 1, and may be implemented by software, or may be implemented by hardware.

Figure 7:
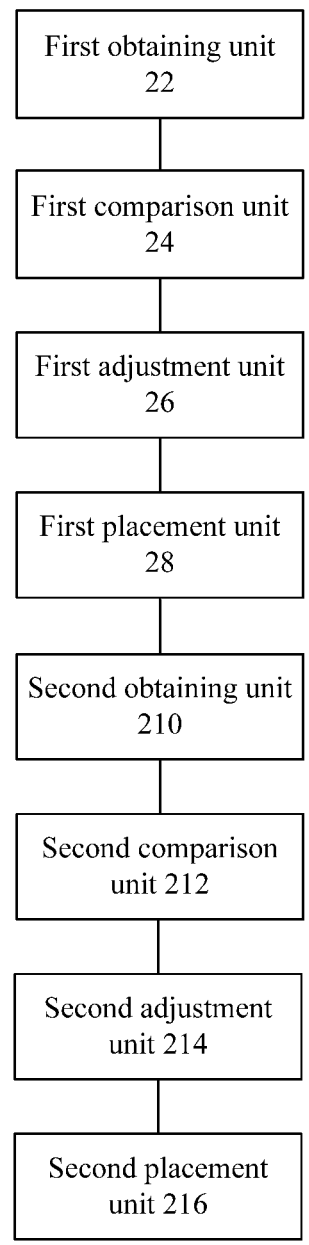
FIG. 7 is a schematic diagram of another optional media file delivery apparatus according to an embodiment of the present disclosure.

In an optional embodiment, FIG. 7 is a schematic diagram of another optional media file delivery apparatus according to an embodiment of the present disclosure. As shown in FIG. 7, this optional embodiment may further include: a second obtaining unit 210, configured to: after the performing a first delivery operation on the first media file according to the resource contention parameter whose value is the second value, obtain a target delivery volume and an actual delivery volume of the first media file; a second comparison unit 212, configured to compare the target delivery volume with the actual delivery volume, to obtain a second comparison result; a second adjustment unit 214, configured to: when the second comparison result indicates that the actual delivery volume is larger than the target delivery volume, and a difference between the actual delivery volume and the target delivery volume is greater than a predetermined threshold, reduce a value of a delivery probability parameter of the first media file from a third value to a fourth value, the delivery probability parameter being used for indicating a probability that the first media file participates in a delivery contention; and a second delivery unit 216, configured to perform a second delivery operation on the first media file according to the delivery probability parameter whose value is the fourth value.

It should be noted that, the second obtaining unit 210 in one embodiment may be configured to perform step S210 in exemplary Embodiment 1 of the present disclosure, the second comparison unit 212 in one embodiment may be configured to perform step S212 in exemplary Embodiment 1 of the present disclosure, the second adjustment unit 214 in one embodiment may be configured to perform step S214 in exemplary Embodiment 1 of the present disclosure, and the second delivery unit 216 in one embodiment may be configured to perform step S216 in exemplary Embodiment 1 of the present disclosure.

It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

In an optional embodiment, when the second comparison result indicates that the actual delivery volume is larger than the target delivery volume, and a difference between the actual delivery volume and the target delivery volume is greater than a predetermined threshold, the second adjustment unit 214 may adjust the value of the delivery probability parameter of the first media file according to the following formula: $p=p \times \theta$. $p$ is the delivery probability parameter of the first media file, $\theta$ is an adjustment coefficient, and $0<\theta<1$.

It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

Figure 8:
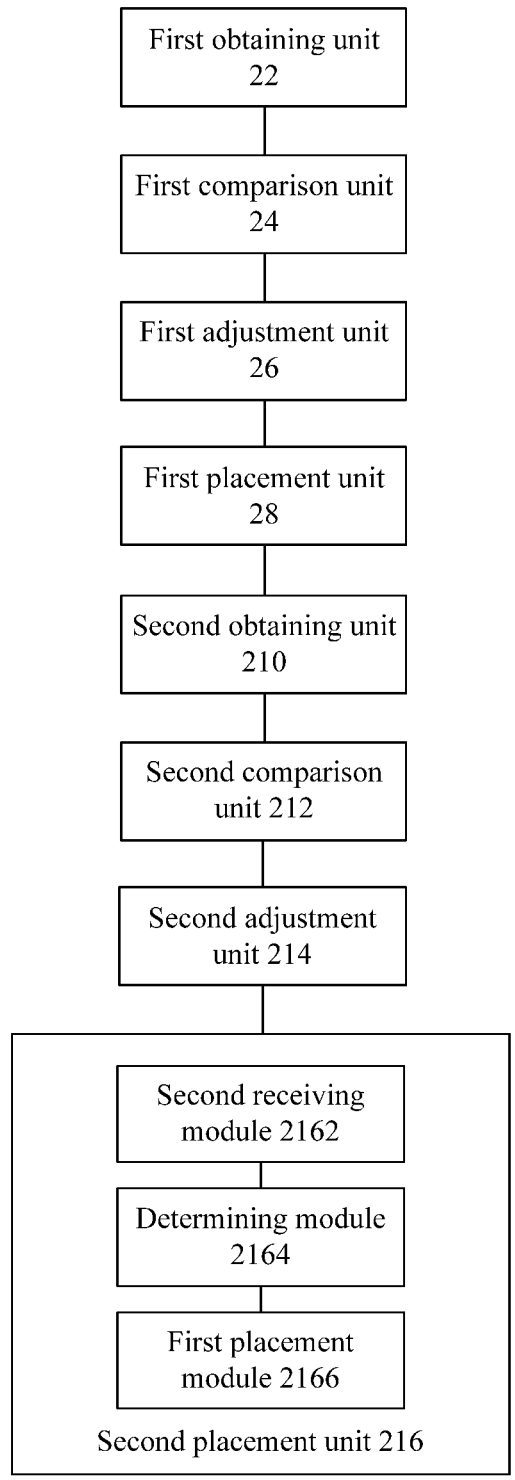
FIG. 8 is a schematic diagram of another optional media file delivery apparatus according to an embodiment of the present disclosure.

In an optional embodiment, FIG. 8 is a schematic diagram of another optional media file delivery apparatus according to an embodiment of the present disclosure. As shown in FIG. 8, the second delivery unit 216 may include: a second receiving module 2162, configured to receive a second delivery request, the second delivery request containing information used for representing a second delivery object; a determining module 2164, configured to determine, according to the delivery probability parameter whose value is the fourth value, whether the first media file participates in a delivery contention requested by the second delivery request; and a first delivery module 2166, configured to: when the first media file participates in the delivery contention requested by the second delivery request, obtain a fourth correlation parameter of the first media file, the fourth correlation parameter being used for indicating a correlation between the first media file and the second delivery object, and select one or more target media files from the first media file and another to-be-delivered third media file to perform the delivery requested by the second delivery request, delivery orders of the first media file and the third media file being determined according to the fourth correlation parameter and a third correlation parameter of the third media file.

It should be noted that, the second receiving module 2162 in one embodiment may be configured to perform step S2162 in exemplary Embodiment 1 of the present disclosure, the determining module 2164 in one embodiment may be configured to perform step S2164 in exemplary Embodiment 1 of the present disclosure, and the first delivery module 2166 in one embodiment may be configured to perform step S2166 in exemplary Embodiment 1 of the present disclosure.

It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

Figure 9:
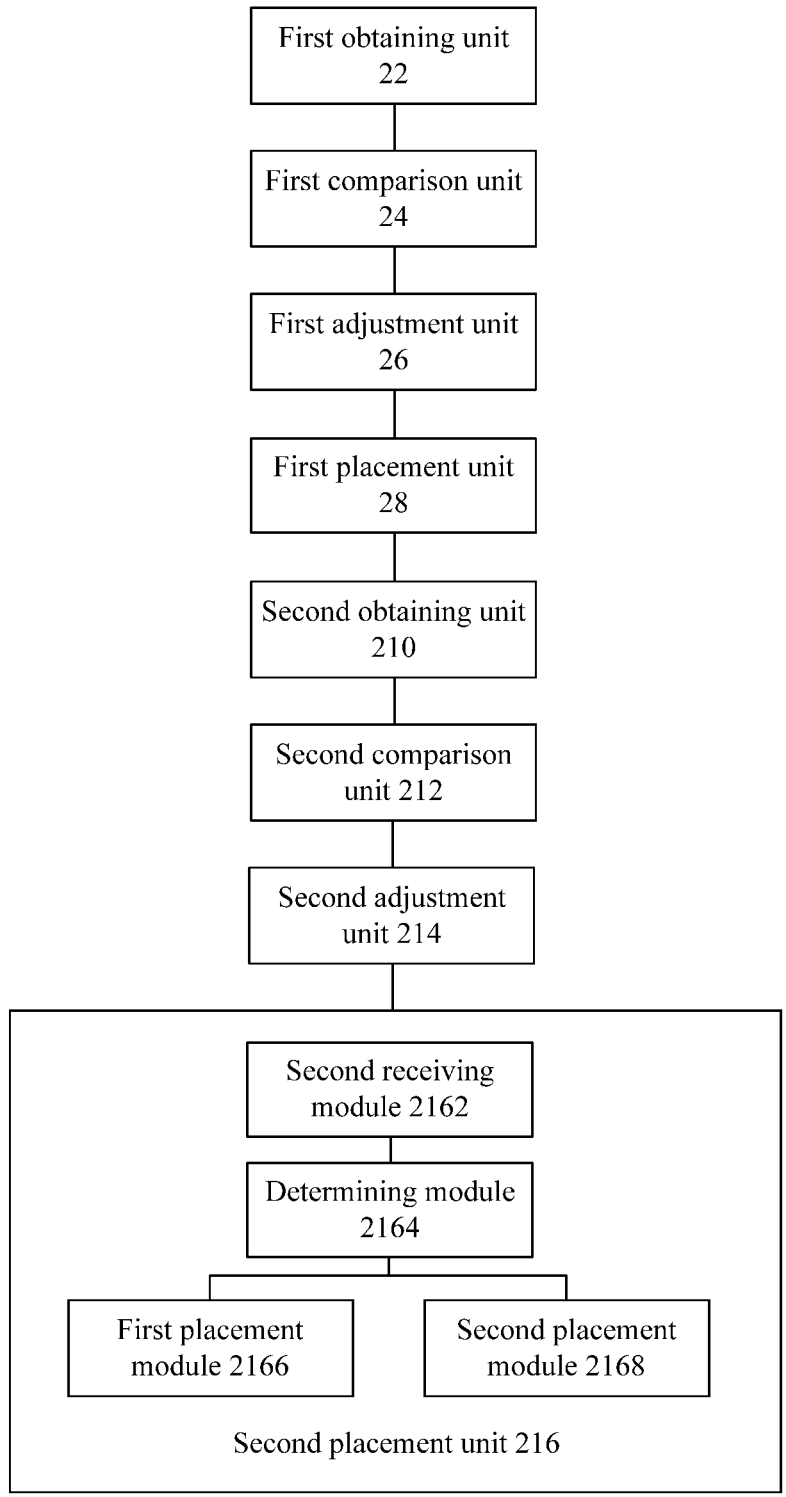
FIG. 9 is a schematic diagram of another optional media file delivery apparatus according to an embodiment of the present disclosure.

In an optional embodiment, FIG. 9 is a schematic diagram of another optional media file delivery apparatus according to an embodiment of the present disclosure. As shown in FIG. 9, the second delivery unit 216 may further include: a second delivery module 2168, configured to: after the determining, according to the delivery probability parameter whose value is the fourth value, whether the first media file participates in a delivery contention requested by the second delivery request, when the first media file does not participate in the delivery contention requested by the second delivery request, obtain a third correlation parameter of the third media file, and select one or more target media files from the third media file to perform the delivery requested by the second delivery request, a delivery order of the third media file being determined according to the third correlation parameter.

It should be noted that, the second delivery module 2168 in one embodiment may be configured to perform step S2168 in exemplary Embodiment 1 of the present disclosure. It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

Figure 10:
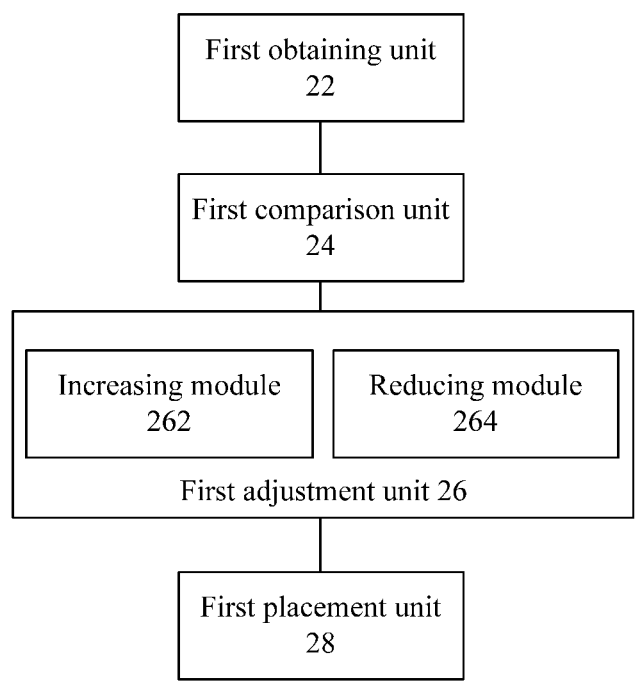
FIG. 10 is a schematic diagram of another optional media file delivery apparatus according to an embodiment of the present disclosure.

In an optional embodiment, FIG. 10 is a schematic diagram of another optional media file delivery apparatus according to an embodiment of the present disclosure. As shown in FIG. 10, the first adjustment unit 26 may include: an increasing module 262, configured to: when the first comparison result indicates that the actual resource consumption is smaller than the target resource consumption, increase the value of the resource contention parameter of the first media file from the first value to the second value, a delivery order determined by the first value being later than a delivery order determined by the second value; and a reducing module 264, configured to: when the first comparison result indicates that the actual resource consumption is greater than the target resource consumption, reduce the value of the resource contention parameter of the first media file from the first value to the second value, a delivery order determined by the first value being earlier than a delivery order determined by the second value.

It should be noted that, the increasing module 262 in one embodiment may be configured to perform step S2062 in exemplary Embodiment 1 of the present disclosure, and the reducing module 264 in one embodiment may be configured to perform step S2064 in exemplary Embodiment 1 of the present disclosure.

It should be noted that, examples and application scenarios of the foregoing modules are the same as those implemented in the corresponding steps, but are not limited to the content disclosed in exemplary Embodiment 1. It should be noted that, the modules as a part of the apparatus may run in the hardware environment shown in FIG. 1, and may be implemented by software, or may be implemented by hardware.

In an optional embodiment, the first adjustment unit 26 may adjust the resource contention parameter of the first media file according to the following formula:

$$paced\_bid = \begin{cases} paced\_bid \times \beta^+, & \text{actual resource consumption is less than target resource consumption} \\ paced\_bid \times \beta^-, & \text{actual resource consumption is greater than target resource consumption} \end{cases}$$

paced_bid is the resource contention parameter of the first media file, $\beta^+$ is a first coefficient, $\beta^+>1$, $\beta^-$ is a second coefficient, and $\beta^-<1$.

It should be noted that, examples and application scenarios of the foregoing modules are the same as those implemented in the corresponding steps, but are not limited to the content disclosed in Embodiment 1. It should be noted that, the modules as a part of the apparatus may run in the hardware environment shown in FIG. 1, and may be implemented by software, or may be implemented by hardware.

In an optional embodiment, the first obtaining unit 22 may obtain the target resource consumption of the first media file according to the following formula:

$$paced\_spending = \frac{\int_{t_{start}}^{t_{curr}} c(t)dt}{\int_{t_{start}}^{t_{end}} c(t)dt} \times Budget.$$

c(t) is an exposure chance curve of the first media file, $t_{start}$ is a delivery start time of the first media file, $t_{end}$ is a delivery end time of the first media file, $t_{curr}$ is a current time, Budget is a total resource consumption of delivering the first media file, and paced_spending is a target resource consumption of the first media file from the delivery start time to the current time.

It should be noted that, examples and application scenarios of the foregoing modules are the same as those implemented in the corresponding steps, but are not limited to the content disclosed in Embodiment 1. It should be noted that, the modules as a part of the apparatus may run in the hardware environment shown in FIG. 1, and may be implemented by software, or may be implemented by hardware.

According to the foregoing modules, the target resource consumption is compared with the actual resource consumption of the first media file, the resource contention parameter is adjusted according to the comparison result, and the delivery operation is performed on the first media file according to the adjusted resource contention parameter. One time of delivery of the first media file corresponds to one time of resource consumption. The resource contention parameter may be used for determining a delivery order of the first media file when the first media file participates in a delivery contention. In this way, an objective of adjusting the delivery order of the first media file according to a delivery speed of the first media file is achieved, a technical effect of stabilizing the delivery speed of the first media file and increasing a delivery correlation of the first media file is achieved, and the technical problem in the related technology that a delivery speed of a bidding advertisement is excessively fast is resolved.

Exemplary Embodiment 3

According to one embodiment of the present disclosure, a terminal device for performing the foregoing media file delivery method is provided.

Figure 11:
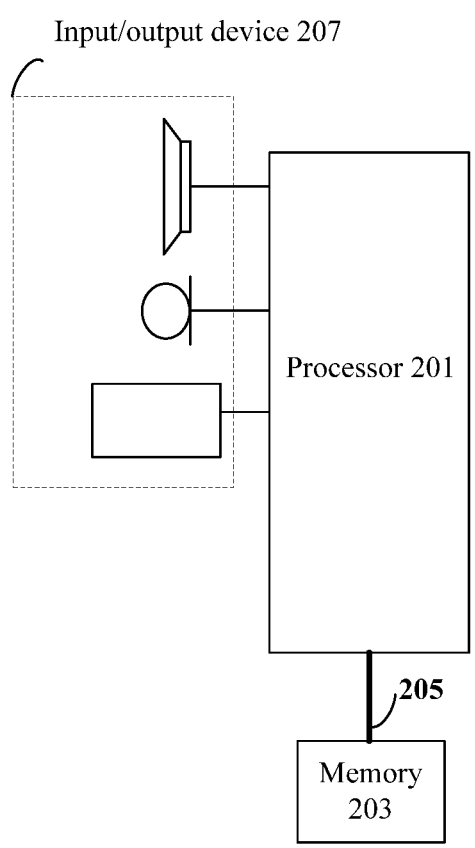
FIG. 11 is a structural block diagram of a terminal device according to an embodiment of the present disclosure.

FIG. 11 is a structural block diagram of a terminal device according to an embodiment of the present disclosure. As shown in FIG. 11, the terminal device may include: one or more (only one is shown in the figure) processors 201, a memory 203, and a transmission apparatus 205. As shown in FIG. 11, the terminal device may further include an input/output device 207.

The memory 203 may be configured to store a software program and module, for example, program instructions/ modules corresponding to the media file delivery method and apparatus in the embodiments of the present disclosure. The processor 201 runs the software program and module stored in the memory 203 to implement various function application and data processing, that is, implement the foregoing media file delivery method. The memory 203 may include a high-speed random memory, and may further include a non-volatile memory such as one or more magnetic storage apparatuses, a flash, or another non-volatile solid-state memory. In some examples, the memory 203 may further include memories remotely disposed relative to the processor 201, and the memories may be connected to the terminal device by using a network. Examples of the network include but are not limited to: the Internet, an intranet, a local area network, a mobile communications network, and a combination thereof.

The foregoing transmission apparatus 205 is configured to receive or send data by using a network, and may further be configured to process data transmission between the processor and the memory. Specific examples of the foregoing network may include a wired network and a wireless network. In an example, the transmission apparatus 205 includes a network adapter (Network Interface Controller, NIC). The network adapter may be connected to another network device and a router by using a network cable, so as to communicate with the Internet or a local area network. In an example, the transmission apparatus 205 is a radio frequency (RF) module, and is configured to communicate with the Internet in a wireless manner.

For example, the memory 203 is configured to store an application program.

The processor 201 may invoke, by using the transmission apparatus 205, the application program stored in the memory 203 to perform the following exemplary steps: obtaining a target resource consumption and an actual resource consumption of a first media file, one time of delivery of the first media file corresponding to one time of resource consumption; comparing the target resource consumption with the actual resource consumption, to obtain a first comparison result; adjusting, according to the first comparison result, a value of a resource contention parameter of the first media file from a first value to a second value, the resource contention parameter being used for determining a delivery order of the first media file when the first media file participates in a delivery contention; and performing a first delivery operation on the first media file according to the resource contention parameter whose value is the second value.

The processor 201 is further configured to perform the following exemplary steps: receiving a first delivery request, the first delivery request containing information used for representing a first delivery object; obtaining a first correlation parameter of the first media file corresponding to the resource contention parameter whose value is the second value, the first correlation parameter being used for indicating a correlation between the first media file and the first delivery object; and selecting, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

The processor 201 is further configured to perform the following exemplary steps: after the performing a first delivery operation on the first media file according to the resource contention parameter whose value is the second value, obtaining a target delivery volume and an actual delivery volume of the first media file; comparing the target delivery volume with the actual delivery volume, to obtain a second comparison result; when the second comparison result indicates that the actual delivery volume is larger than the target delivery volume, and a difference between the actual delivery volume and the target delivery volume is greater than a predetermined threshold, reducing a value of a delivery probability parameter of the first media file from a third value to a fourth value, the delivery probability parameter being used for indicating a probability that the first media file participates in a delivery contention; and performing a second delivery operation on the first media file according to the delivery probability parameter whose value is the fourth value.

The processor 201 is further configured to perform the following exemplary steps: when the second comparison result indicates that the actual delivery volume is larger than the target delivery volume, and a difference between the actual delivery volume and the target delivery volume is greater than a predetermined threshold, adjusting the value of the delivery probability parameter of the first media file according to the following formula: $p=p\times\theta$. p is the delivery probability parameter of the first media file, $\theta$ is an adjustment coefficient, and $0<\theta<1$.

The processor 201 is further configured to perform the following exemplary steps: receiving a second delivery request, the second delivery request containing information used for representing a second delivery object; determining, according to the delivery probability parameter whose value is the fourth value, whether the first media file participates in a delivery contention requested by the second delivery request; and when the first media file participates in the delivery contention requested by the second delivery request, obtaining a fourth correlation parameter of the first media file, the fourth correlation parameter being used for indicating a correlation between the first media file and the second delivery object, and selecting one or more target media files from the first media file and another to-be-delivered third media file to perform the delivery requested by the second delivery request, delivery orders of the first media file and the third media file being determined according to the fourth correlation parameter and a third correlation parameter of the third media file.

The processor 201 is further configured to perform the following exemplary steps: after the determining, according to the delivery probability parameter whose value is the fourth value, whether the first media file participates in a delivery contention requested by the second delivery request, when the first media file does not participate in the delivery contention requested by the second delivery request, obtaining a third correlation parameter of the third media file, and selecting one or more target media files from the third media file to perform the delivery requested by the second delivery request, a delivery order of the third media file being determined according to the third correlation parameter.

The processor 201 is further configured to perform the following exemplary steps: when the first comparison result indicates that the actual resource consumption is smaller than the target resource consumption, increasing the value of the resource contention parameter of the first media file from the first value to the second value, a delivery order determined by the first value being later than a delivery order determined by the second value; or when the first comparison result indicates that the actual resource consumption is greater than the target resource consumption, reducing the value of the resource contention parameter of the first media file from the first value to the second value, a delivery order determined by the first value being earlier than a delivery order determined by the second value.

The processor 201 is further configured to perform the following exemplary steps: adjusting the resource contention parameter of the first media file according to the following formula:

$$paced\_bid = \begin{cases} paced\_bid \times \beta^+, & \text{actual resource consumption is less than target resource consumption} \\ paced\_bid \times \beta^-, & \text{actual resource consumption is greater than target resource consumption} \end{cases},$$

paced_bid is the resource contention parameter of the first media file, $\beta^+$ is a first coefficient, $\beta^+>1$, $\beta^-$ is a second coefficient, and $\beta^-<1$.

The processor 201 is further configured to perform the following exemplary steps: obtaining the target resource consumption of the first media file according to the following formula:

$$paced\_spending = \frac{\int_{t_{start}}^{t_{curr}} c(t)dt}{\int_{t_{start}}^{t_{end}} c(t)dt} \times \text{Budget}.$$

$c(t)$ is an exposure chance curve of the first media file, $t_{start}$ is a delivery start time of the first media file, $t_{end}$ is a delivery end time of the first media file, $t_{curr}$ is a current time, Budget is a total resource consumption of delivering the first media file, and paced_spending is a target resource consumption of the first media file from the delivery start time to the current time.

According to one embodiment of the present disclosure, a media file delivery solution is provided. The target resource consumption is compared with the actual resource consumption of the first media file, the resource contention parameter is adjusted according to the comparison result, and the delivery operation is performed on the first media file according to the adjusted resource contention parameter. One time of delivery of the first media file corresponds to one time of resource consumption. The resource contention parameter may be used for determining a delivery order of the first media file when the first media file participates in a delivery contention. In this way, an objective of adjusting the delivery order of the first media file according to a delivery speed of the first media file is achieved, a technical effect of stabilizing the delivery speed of the first media file and increasing a delivery correlation of the first media file is achieved, and the technical problem in the related technology that a delivery speed of a bidding advertisement is excessively fast is resolved.

Optionally, for a specific example in one embodiment, refer to the examples described in exemplary Embodiment 1 and exemplary Embodiment 2. This is not described in detail in one embodiment.

A person of ordinary skill in the art may understand that the structure shown in FIG. 11 is only an example. The terminal device may be a terminal device such as a smartphone (for example, an Android phone or an iOS phone), a tablet computer, a palmtop computer, a mobile Internet device (MID), or a PAD. FIG. 11 does not limit the structure of the foregoing electronic device. For example, the terminal device may include more or fewer components (such as a network interface or a display apparatus) than those shown in FIG. 11, or may have a configuration different from that shown in FIG. 11.

A person of ordinary skill in the art may understand that all or some of the steps of the methods in the embodiments may be implemented by a program instructing relevant hardware of the terminal device. The program may be stored in a computer-readable storage medium, and the storage medium may be a flash drive, a (ROM), a (RAM), a magnetic disk, an optical disk, or the like.

Exemplary Embodiment 4

One embodiment of the present disclosure further provides a storage medium. Optionally, in one embodiment, the storage medium may be used for executing program code or program instructions of a media file delivery method.

Optionally, in one embodiment, the storage medium may be located in at least one of a plurality of network devices on a network shown in the foregoing embodiments.

Optionally, in one embodiment, the storage medium is configured to store program code for performing the following exemplary steps:

S1: Obtaining a target resource consumption and an actual resource consumption of a first media file, one time of delivery of the first media file corresponding to one time of resource consumption.

S2: Comparing the target resource consumption with the actual resource consumption, to obtain a first comparison result.

S3: Adjusting, according to the first comparison result, a value of a resource contention parameter of the first media file from a first value to a second value, the resource contention parameter being used for determining a delivery order of the first media file when the first media file participates in a delivery contention.

S4: Performing a first delivery operation on the first media file according to the resource contention parameter whose value is the second value.

Optionally, the storage medium is further configured to store program code for executing the following exemplary steps: receiving a first delivery request, the first delivery request containing information used for representing a first delivery object; obtaining a first correlation parameter of the first media file corresponding to the resource contention parameter whose value is the second value, the first correlation parameter being used for indicating a correlation between the first media file and the first delivery object; and selecting, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

Optionally, the storage medium is further configured to store program code for executing the following exemplary steps: after the performing a first delivery operation on the first media file according to the resource contention parameter whose value is the second value, obtaining a target delivery volume and an actual delivery volume of the first media file; comparing the target delivery volume with the actual delivery volume, to obtain a second comparison result; when the second comparison result indicates that the actual delivery volume is larger than the target delivery volume, and a difference between the actual delivery volume and the target delivery volume is greater than a predetermined threshold, reducing a value of a delivery probability parameter of the first media file from a third value to a fourth value, the delivery probability parameter being used for indicating a probability that the first media file participates in a delivery contention; and performing a second delivery operation on the first media file according to the delivery probability parameter whose value is the fourth value.

Optionally, the storage medium is further configured to store program code for executing the following step: when the second comparison result indicates that the actual delivery volume is larger than the target delivery volume, and a difference between the actual delivery volume and the target delivery volume is greater than a predetermined threshold, adjusting the value of the delivery probability parameter of the first media file according to the following formula: $p=p \times \theta$. p is the delivery probability parameter of the first media file, $\theta$ is an adjustment coefficient, and $0<\theta<1$.

Optionally, the storage medium is further configured to store program code for executing the following exemplary steps: receiving a second delivery request, the second delivery request containing information used for representing a second delivery object; determining, according to the delivery probability parameter whose value is the fourth value, whether the first media file participates in a delivery contention requested by the second delivery request; and when the first media file participates in the delivery contention requested by the second delivery request, obtaining a fourth correlation parameter of the first media file, the fourth correlation parameter being used for indicating a correlation between the first media file and the second delivery object, and selecting one or more target media files from the first media file and another to-be-delivered third media file to perform the delivery requested by the second delivery request, delivery orders of the first media file and the third media file being determined according to the fourth correlation parameter and a third correlation parameter of the third media file.

Optionally, the storage medium is further configured to store program code for executing the following exemplary steps: after the determining, according to the delivery probability parameter whose value is the fourth value, whether the first media file participates in a delivery contention requested by the second delivery request, when the first media file does not participate in the delivery contention requested by the second delivery request, obtaining a third correlation parameter of the third media file, and selecting one or more target media files from the third media file to perform the delivery requested by the second delivery request, a delivery order of the third media file being determined according to the third correlation parameter.

Optionally, the storage medium is further configured to store program code for executing the following exemplary steps: when the first comparison result indicates that the actual resource consumption is smaller than the target resource consumption, increasing the value of the resource contention parameter of the first media file from the first value to the second value, a delivery order determined by the first value being later than a delivery order determined by the second value; or when the first comparison result indicates that the actual resource consumption is greater than the target resource consumption, reducing the value of the resource contention parameter of the first media file from the first value to the second value, a delivery order determined by the first value being earlier than a delivery order determined by the second value.

Optionally, the storage medium is further configured to store program code for executing the following step: adjusting the resource contention parameter of the first media file according to the following formula:

$$paced\_bid = \begin{cases} paced\_bid \times \beta^+, & \text{actual resource consumption is less than target resource consumption} \\ paced\_bid \times \beta^-, & \text{actual resource consumption is greater than target resource consumption} \end{cases}$$

paced_bid is the resource contention parameter of the first media file, $\beta^+$ is a first coefficient, $\beta^+>1$, $\beta^-$ is a second coefficient, and $\beta^-<1$.

Optionally, the storage medium is further configured to store program code for executing the following step: obtaining the target resource consumption of the first media file according to the following formula:

$$paced\_spending = \frac{\int_{t_{start}}^{t_{curr}} c(t)dt}{\int_{t_{start}}^{t_{end}} c(t)dt} \times Budget.$$

c(t) is an exposure chance curve of the first media file, $t_{start}$ is a delivery start time of the first media file, $t_{end}$ is a delivery end time of the first media file, $t_{curr}$ is a current time, Budget is a total resource consumption of delivering the first media file, and paced_spending is a target resource consumption of the first media file from the delivery start time to the current time.

Optionally, for a specific example in one embodiment, refer to the examples described in exemplary Embodiment 1 and exemplary Embodiment 2. This is not described in detail in one embodiment.

In the embodiments of the present disclosure, the target resource consumption is compared with the actual resource consumption of the first media file, the resource contention parameter is adjusted according to the comparison result, and the delivery operation is performed on the first media file according to the adjusted resource contention parameter. One time of delivery of the first media file corresponds to one time of resource consumption. The resource contention parameter may be used for determining a delivery order of the first media file when the first media file participates in a delivery contention. In this way, an objective of adjusting the delivery order of the first media file according to a delivery speed of the first media file is achieved, a technical effect of stabilizing the delivery speed of the first media file and increasing a delivery correlation of the first media file is achieved, and the technical problem in the related technology that a delivery speed of a bidding advertisement is excessively fast is resolved.

Optionally, in one embodiment, the storage medium may include but is not limited to any medium that may store program code such as a USB flash drive, a ROM, a RAM, a removable hard disk, a magnetic disk, or an optical disk.

The sequence numbers of the foregoing embodiments of the present disclosure are merely for description but do not indicate the preference of the embodiments.

When being implemented in a form of a software functional unit and sold or used as an independent product, the integrated unit in the foregoing embodiments may be stored in the foregoing computer-readable storage medium. Based on such an understanding, the technical solutions in the present disclosure essentially, or the part contributing to the existing technology, or all or some of the technical solutions may be implemented in a form of a software product. The computer software product is stored in a storage medium and includes several instructions for instructing one or more computer devices (which may be a PC, a server, a network device, or the like) to perform all or some of the steps of the methods in the embodiments of the present disclosure.

In the foregoing embodiments of the present disclosure, although the description of each exemplary embodiment has respective focuses, for the part that is not detailed in one of the exemplary embodiments, that part may refer to the relevant description of other embodiments.

In the several embodiments provided in the present disclosure, it should be understood that the disclosed client may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary implementations of the present disclosure. It should be noted that a person of ordinary skill in the art may make improvements and polishing without departing from the principle of the present disclosure and the improvements and polishing shall fall within the protection scope of the present disclosure.

What is claimed is:

1. A media file delivery method, comprising:
    obtaining, by a computing device including at least one processor, a target resource consumption and an actual resource consumption of a first media file, one time of delivery of the first media file corresponding to one time of resource consumption;
    comparing, by the computing device, the target resource consumption with the actual resource consumption, to obtain a first comparison result;
    adjusting, by the computing device according to the first comparison result, a value of a resource contention parameter of the first media file from a first value to a second value, the resource contention parameter being used for determining a delivery order of the first media file when the first media file participates in a delivery contention;
    performing, by the computing device, a first delivery operation on the first media file according to the resource contention parameter whose value is the second value;
    after the first delivery operation, comparing a target delivery volume with an actual delivery volume of the first media file;
    when the actual delivery volume is larger than the target delivery volume, and a difference between the actual delivery volume and the target delivery volume is greater than a predetermined threshold, reducing a delivery probability parameter of the first media file from a third value to a fourth value by multiplying an adjustment coefficient greater than 0 and less than 1, the delivery probability parameter indicating a probability that the first media file participates in a delivery contention; and
    performing a second delivery operation on the first media file according to the delivery probability parameter having the fourth value.

2. The method according to claim 1, wherein the performing a first delivery operation on the first media file according to the resource contention parameter whose value is the second value comprises:
    receiving a first delivery request, the first delivery request containing information used for representing a first delivery object;
    obtaining a first correlation parameter of the first media file corresponding to the resource contention parameter whose value is the second value, the first correlation parameter being used for indicating a correlation between the first media file and the first delivery object; and
    selecting, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

3. The method according to claim 1, wherein the performing a second delivery operation on the first media file according to the delivery probability parameter whose value is the fourth value comprises:
    receiving a second delivery request, the second delivery request containing information representing a second delivery object;
    determining, according to the delivery probability parameter whose value is the fourth value, whether the first media file participates in a delivery contention requested by the second delivery request; and
    when the first media file participates in the delivery contention requested by the second delivery request, obtaining a fourth correlation parameter of the first media file, the fourth correlation parameter being used for indicating a correlation between the first media file and the second delivery object, and selecting one or more target media files from the first media file and another to-be-delivered third media file to perform the delivery requested by the second delivery request, delivery orders of the first media file and the third media file being determined according to the fourth correlation parameter and a third correlation parameter of the third media file.

4. The method according to claim 3, wherein after the determining, according to the delivery probability parameter whose value is the fourth value, whether the first media file participates in a delivery contention requested by the second delivery request, the method further comprises:
when the first media file does not participate in the delivery contention requested by the second delivery request, obtaining the third correlation parameter of the third media file, and selecting one or more target media files from the third media file to perform the delivery requested by the second delivery request, a delivery order of the third media file being determined according to the third correlation parameter.

5. The method according to claim 1, wherein the adjusting, according to the first comparison result, a value of a resource contention parameter of the first media file from a first value to a second value comprises:
when the first comparison result indicates that the actual resource consumption is smaller than the target resource consumption, increasing the value of the resource contention parameter of the first media file from the first value to the second value, a delivery order determined by the first value being later than a delivery order determined by the second value.

6. The method according to claim 1, wherein the adjusting, according to the first comparison result, a value of a resource contention parameter of the first media file from a first value to a second value comprises:
when the first comparison result indicates that the actual resource consumption is greater than the target resource consumption, reducing the value of the resource contention parameter of the first media file from the first value to the second value, a delivery order determined by the first value being earlier than a delivery order determined by the second value.

7. The method according to claim 1, wherein the resource contention parameter of the first media file is adjusted according to a following formula:

$$paced\_bid = \begin{cases} paced\_bid \times \beta^+, \text{ actual resource consumption} \\ \quad \text{is less than target resource consumption} \\ paced\_bid \times \beta^-, \text{ actual resource consumption} \\ \quad \text{is greater than target resource consumption} \end{cases},$$

paced_bid being the resource contention parameter of the first media file, $\beta^+$ being a first coefficient, $\beta^+ > 1$, $\beta^-$ being a second coefficient, and $\beta^- < 1$.

8. The method according to claim 1, wherein the target resource consumption of the first media file is obtained according to a following formula:

$$paced\_spending = \frac{\int_{t_{start}}^{t_{curr}} c(t)dt}{\int_{t_{start}}^{t_{end}} c(t)dt} \times Budget$$

start c(t) being an exposure chance curve of the first media file, $t_{start}$ being a delivery start time of the first media file, $t_{end}$ being a delivery end time of the first media file, $t_{curr}$ being a current time, Budget being a total resource consumption of delivering the first media file, and paced_spending being a target resource consumption of the first media file from the delivery start time to the current time.

9. A media file delivery apparatus, comprising:
a memory, configured to store program instructions; and
a processor, coupled to the memory and when the program instructions being executed, configured to:
obtain a target resource consumption and an actual resource consumption of a first media file, one time of delivery of the first media file corresponding to one time of resource consumption;
compare the target resource consumption with the actual resource consumption, to obtain a first comparison result;
adjust, according to the first comparison result, a value of a resource contention parameter of the first media file from a first value to a second value, the resource contention parameter being used for determining a delivery order of the first media file when the first media file participates in a delivery contention;
perform a first delivery operation on the first media file according to the resource contention parameter whose value is the second value
after the first delivery operation, compare a target delivery volume with an actual delivery volume of the first media file;
when the actual delivery volume is larger than the target delivery volume, and a difference between the actual delivery volume and the target delivery volume is greater than a predetermined threshold, reduce a delivery probability parameter of the first media file from a third value to a fourth value by multiplying an adjustment coefficient greater than 0 and less than 1, the delivery probability parameter indicating a probability that the first media file participates in a delivery contention; and
perform a second delivery operation on the first media file according to the delivery probability parameter having the fourth value.

10. The apparatus according to claim 9, wherein the processor is further configured to:
receive a first delivery request, the first delivery request containing information used for representing a first delivery object;
obtain a first correlation parameter of the first media file corresponding to the resource contention parameter whose value is the second value, the first correlation parameter being used for indicating a correlation between the first media file and the first delivery object; and
select, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

11. The apparatus according to claim 9, wherein the processor is further configured to:
receive a second delivery request, the second delivery request containing information used for representing a second delivery object;

determine, according to the delivery probability parameter whose value is the fourth value, whether the first media file participates in a delivery contention requested by the second delivery request; and when the first media file participates in the delivery contention requested by the second delivery request, obtain a fourth correlation parameter of the first media file, the fourth correlation parameter being used for indicating a correlation between the first media file and the second delivery object, and select one or more target media files from the first media file and another to-be-delivered third media file to perform the delivery requested by the second delivery request, delivery orders of the first media file and the third media file being determined according to the fourth correlation parameter and a third correlation parameter of the third media file.

12. The apparatus according to claim 11, wherein the processor is further configured to:

after the determining, according to the delivery probability parameter whose value is the fourth value, whether the first media file participates in a delivery contention requested by the second delivery request, when the first media file does not participate in the delivery contention requested by the second delivery request, obtain a third correlation parameter of the third media file, and select one or more target media files from the third media file to perform the delivery requested by the second delivery request, a delivery order of the third media file being determined according to the third correlation parameter.

13. The apparatus according to claim 9, wherein the processor is further configured to:

when the first comparison result indicates that the actual resource consumption is smaller than the target resource consumption, increase the value of the resource contention parameter of the first media file from the first value to the second value, a delivery order determined by the first value being later than a delivery order determined by the second value.

14. The apparatus according to claim 9, wherein the processor is further configured to:

when the first comparison result indicates that the actual resource consumption is greater than the target resource consumption, reduce the value of the resource contention parameter of the first media file from the first value to the second value, a delivery order determined by the first value being earlier than a delivery order determined by the second value.

15. A non-transitory computer-readable storage medium containing computer-executable program instructions for, when executed by a processor, performing a media file delivery method, the method comprising:

obtaining a target resource consumption and an actual resource consumption of a first media file, one time of delivery of the first media file corresponding to one time of resource consumption;

comparing the target resource consumption with the actual resource consumption, to obtain a first comparison result;

adjusting, according to the first comparison result, a value of a resource contention parameter of the first media file from a first value to a second value, the resource contention parameter being used for determining a delivery order of the first media file when the first media file participates in a delivery contention;

performing a first delivery operation on the first media file according to the resource contention parameter whose value is the second value;

after the first delivery operation, comparing a target delivery volume with an actual delivery volume of the first media file;

when the actual delivery volume is larger than the target delivery volume, and a difference between the actual delivery volume and the target delivery volume is greater than a predetermined threshold, reducing a delivery probability parameter of the first media file from a third value to a fourth value by multiplying an adjustment coefficient greater than 0 and less than 1, the delivery probability parameter indicating a probability that the first media file participates in a delivery contention; and performing a second delivery operation on the first media file according to the delivery probability parameter having the fourth value.

16. The storage medium according to claim 15, wherein the performing a first delivery operation on the first media file according to the resource contention parameter whose value is the second value comprises:

receiving a first delivery request, the first delivery request containing information used for representing a first delivery object;

obtaining a first correlation parameter of the first media file corresponding to the resource contention parameter whose value is the second value, the first correlation parameter being used for indicating a correlation between the first media file and the first delivery object; and selecting, according to the first correlation parameter and a second correlation parameter of another to-be-delivered second media file, one or more target media files from the first media file and the second media file to perform a delivery requested by the first delivery request, delivery orders of the first media file and the second media file being determined according to the first correlation parameter and the second correlation parameter.

* * * * *